United States Patent [19]

Malsot et al.

[11] 4,181,400
[45] Jan. 1, 1980

[54] CONNECTOR WITH POSITIONING SLEEVES FOR A SINGLE OPTICAL FIBRE

[75] Inventors: Christian Malsot; Marcel Roux, both of Suresnes, France

[73] Assignee: Socapex, Suresnes, France

[21] Appl. No.: 864,703

[22] Filed: Dec. 27, 1977

[30] Foreign Application Priority Data

Dec. 31, 1976 [FR] France .................. 76 39718

[51] Int. Cl.² ................................. G02B 5/14
[52] U.S. Cl. ............................. 350/96.21; 350/96.20
[58] Field of Search ................. 350/96.20, 96.21, 96.22

[56] References Cited

U.S. PATENT DOCUMENTS

| 4,045,121 | 8/1977 | Clark | 350/96.21 |
| 4,062,620 | 12/1977 | Pirolli | 350/96.20 |

OTHER PUBLICATIONS

"Connector from AEG-Telefunken Aligns Ends of Optical Fibers Automatically" *Electronics*, Nov. 11, 1976, pp. 8E-13E.

*Primary Examiner*—John K. Corbin
*Assistant Examiner*—John D. Lee
*Attorney, Agent, or Firm*—Cushman, Darby & Cushman

[57] ABSTRACT

Connector in two parts for the connection of two single optical fibres, each part containing a cylindrical sleeve with a V-shaped longitudinal groove to receive the single fibre, said groove being sloped in relation with the axis of the sleeve, the achievement of any desired positioning of the contact face of each optical fibre being obtained by parting off each sleeve at a predetermined length.

8 Claims, 6 Drawing Figures

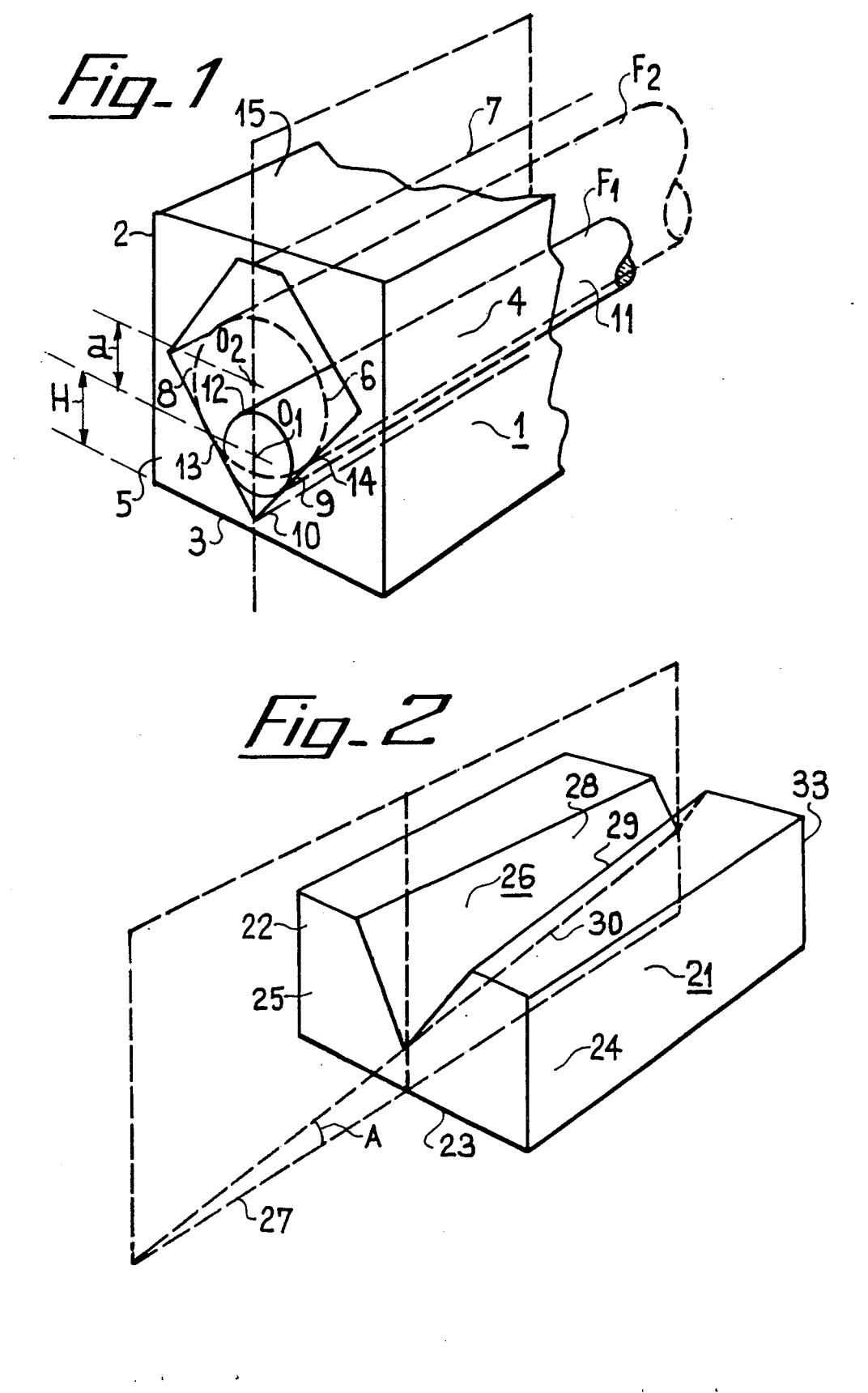

Fig_1

Fig_2

CONNECTOR WITH POSITIONING SLEEVES FOR A SINGLE OPTICAL FIBRE

The present invention relates to the field of connectors for fibre optic transmission lines, more particularly to the case of lines of this kind which comprise only a single fibre.

In a case of this kind, the connection between the contact faces of two single fibres, due to the very small dimensions of their right section, typically requires surfaces which are delimited by circles of the order of 100 microns in diameter, and high precision in the transverse positioning of the ends of the two single fibres located in their respective tip arrangements.

The increasingly widespread use, in practical situations, of optical transmission systems, leads to the need to provide connectors which on the one hand have a simple structure, not requiring high manufacturing precision and on the other hand the facility for implementation without the need for complicated tooling and by unskilled labour, at this point of utilisation, such for example as shipyards, etc.

Proposals have already been made in respect of devices which effect the desired positioning by the use of means which are independent of the endpieces themselves, such as arrangements employing centering jigs or fixtures, these lending themselves, exclusively to application in the workshop.

Again, end pieces have been proposed which can be employed in the industrial situation and which appropriately clamp the single fibre which is to be positioned although these have generally had to be adapted in terms of their effective zones, to a scale comparable to that of the single fibre they are to accomodate. This scale, as has already been mentioned, being very small, means that with this kind of tip arrangement a mechanical production has to be extremely precise and therefore expensive, and implementation is an extremely delicate operation since these tip arrangements often comprise an axial passage whose internal diameter is hardly any larger than the diameter of the single fibre.

In addition, the manufacture of the optical fibres themselves results in fibres whose diameters exhibit a spread around their nominal diameter, in accordance with extreme limits of the order of + or $-5\%$. Connector tip arrangements for single fibres, of known design, although correctly perfoming their function vis-a-vis this nominal value, generally do not perform it so well in respect of these extreme limiting diameter values.

The present invention is not open to any of these drawbacks. It makes it possible to precisely position the contact face of a single fibre in a sleeve, either one constituting the tip arrangement or a separate one, in which it is subsequently located without the need for any high degree of precision. The invention furthermore makes it possible to achieve this result within a range of fibre diameters extending across wide limits.

The sleeve in accordance with the invention, finally, comprises its own facilities for adjusting the positioning, so that workshop adjustments are unnecessary and adjustment can be performed quite simply directly on site.

In principle, the invention has recourse to a positioning sleeve comprising a longitudinal passage to receive a single fibre, this passage making a given angle in relation to a reference surface of the sleeve defining its position.

After attachment of a single fibre in the passage, it is possible, at the time of the simultaneous machining and final polishing of the contact face of sleeve and optical fibre, to select any desired interval between the axis of the contact face of the fibre and the reference surface, this distance being associated, due to the inclination of the passage and the fibre located there, with the length of passage removed at the time of said machining and polishing operations.

More precisely, the invention relates to a positioning sleeve for a connector of a single optical fibre, which is constituted by a body of longitudinal axis with a lateral positioning face, parallel to said axis, and two terminal faces, respectively at front and rear, said body comprising a passage to receive a single fibre and opening onto said terminal faces, whose walls are delimited by two planar portions defining a dihedral angle, characterised in that said dihedral angle has its bisector disposed parallel to said axis and perpendicularly to said basic positioning face, its apex making an angle with said plane, which ranges within a span of values greater than 0 degrees and less than 10 degrees.

The invention will be better understood from a consideration of the ensuing description and by reference to the ensuing Figures in which:

FIG. 1 illustrates a positioning sleeve for the tip arrangement for a connector for a single optical fibre, as utilised in accordance with the prior art;

FIG. 2 illustrates a positioning sleeve for a single optical fibre, in accordance with the invention;

Figure 3A:
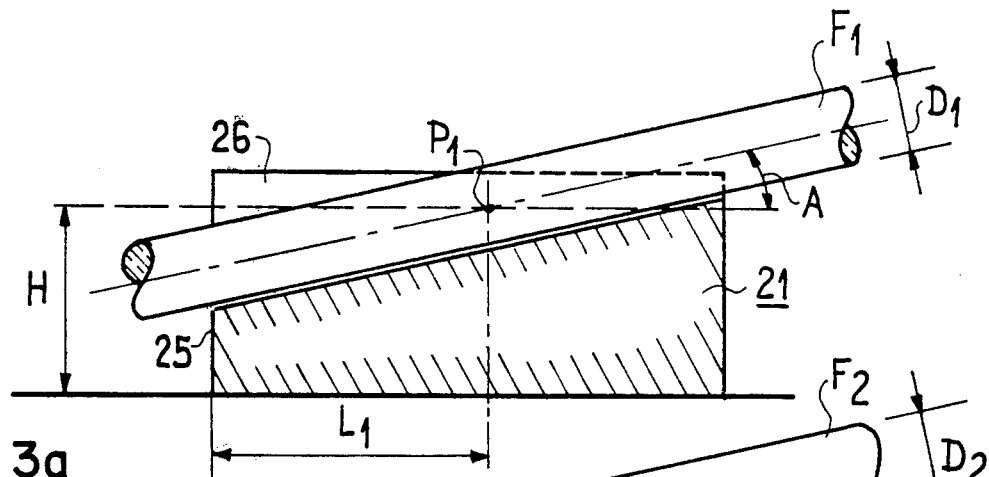
Figure 3B:
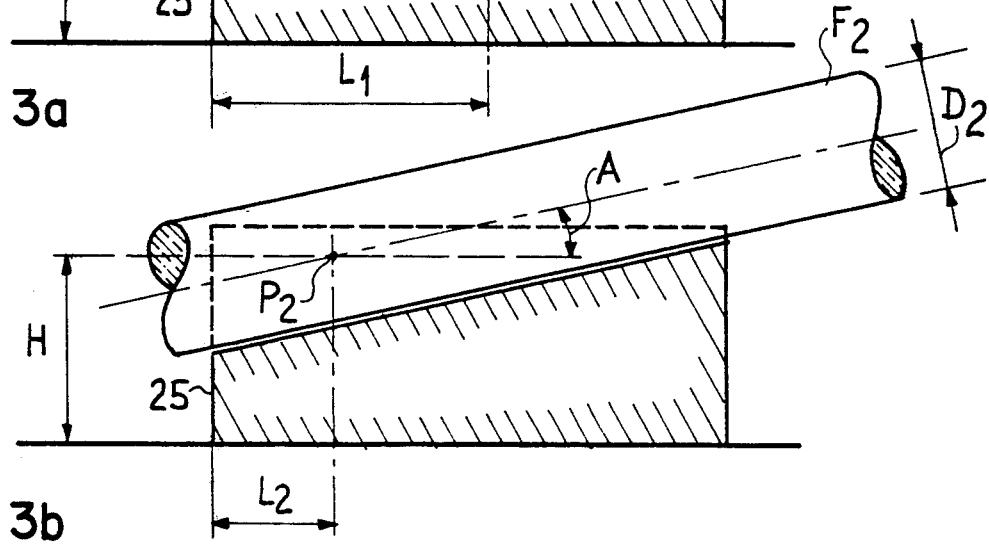
Figure 4:
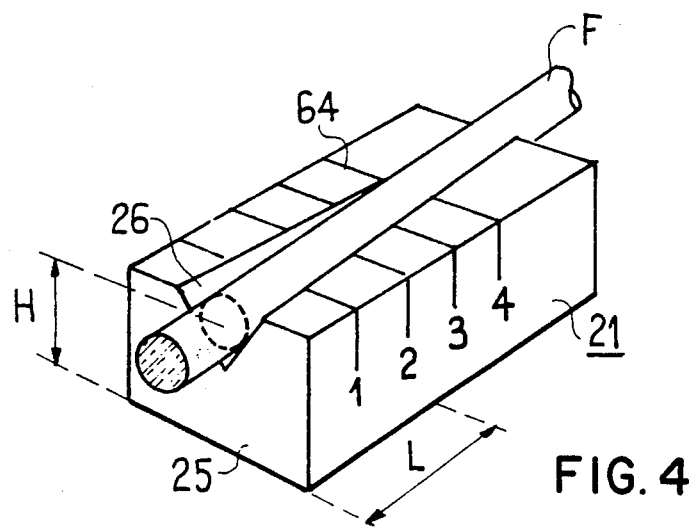
Figure 5:
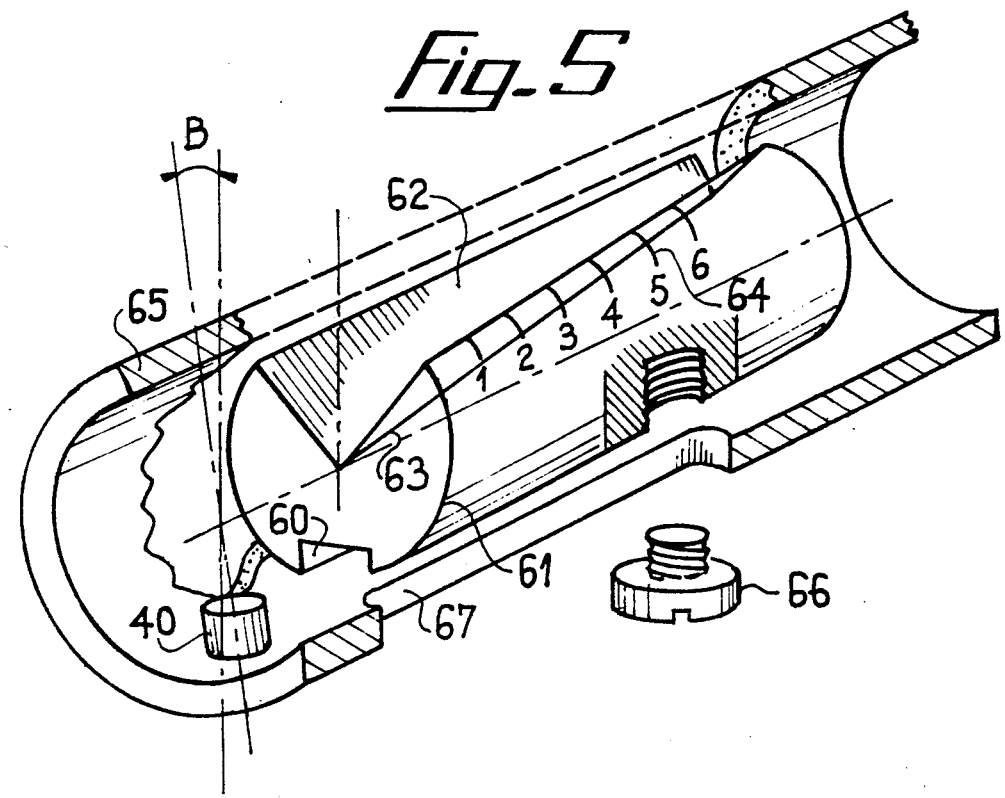
Figure 6:
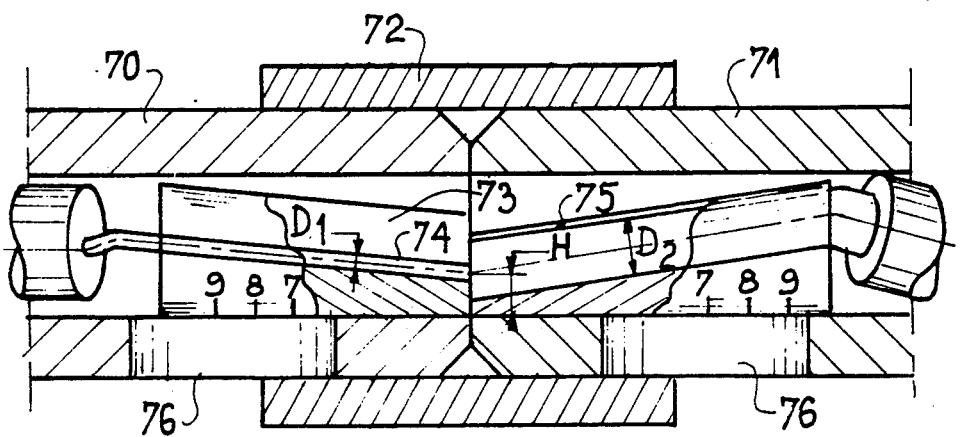

FIG. 3, in the form of two explanatory diagrams, illustrates two cases of the implementation of the sleeve in accordance with the invention, respectively at (a) for a fibre of given diameter and at (b) for a fibre of larger diameter;

FIG. 4 illustrates the positioning sleeve in accordance with the invention, provided with a graduation;

FIG. 5 illustrates an embodiment of the positioning sleeve in accordance with the invention, in the case where it is applied to a connector exhibiting cylindrical symmetry; and FIG. 6 illustrates a sleeve for a single optical fibre, equipped with positioning sleeves in accordance with the invention.

FIG. 1 illustrates a positioning sleeve for the tip arrangement of a single optical fibre in accordance with the prior art. This sleeve has a body 1 with external lateral surfaces such as those 2, 3 and 4, parallel to its longitudinal axis 7, a front contact face 5 and a rear face, both of which latter are perpendicular to the aforesaid axis.

Finally, to receive the single optical fibre, it is equipped with a passage 6 parallel to the longitudinal axis 7 and opening onto said two faces. The passage is delimited internally by planes such as those 8 and 9, arranged in a dihedral disposition, which intersect one another at the straight intersection line or ridge 10, in accordance with an arrangement known in the art by the term "Vee."

The way in which this kind of positioning sleeve is applied is as follows:

In a first stage, the fibre 11 to be positioned, after having possibly had its protective sheath removed, is introduced into the passage 6 where, by external means, it is applied to one of the dihedrals or "Vees" defined earlier.

It is then known that the cylindrical fibre is located without any "backlash" and in a unique fashion, in the Vee, with its right circular section 12 tangentially disposed to the straight lines of right section, 13 and 14, of the planes 8 and 9; its center $O_1$ is then located on the plane of symmetry 15 of the dihedral angle and, by choosing the lateral bottom face 3 perpendicular to said plane of symmetry, as the basic positioning face, the centre is accordingly located at a fully defined distance H from said face.

In accordance with known geometrical theory, this distance depends upon the angle of the dihedral and upon the angle of the fibre tangenting it.

In a second stage, the fibre is secured in the Vee of the sleeve by a hardenable product introduced in fluid form into the passage.

Finally, in a third stage, the front contact face 5 from which the fibre 11 emerges as well as part of the filling product, is subjected to an overall polishing operation of the kind required for good optical transmission.

The thus finished sleeve is then ready to be used either in association with another, identical sleeve, a common centering element which has not been shown being provided in order to bring them opposite one another so that they are in contact with each other through the lateral surfaces 2, 3 and 4, or to be fixed in an external tip arrangment (not shown) whose internal surfaces are designed to bear against the lateral surfaces 2 and 4 and the base surface 3 of the sleeve, which define the positioning references.

However, a sleeve of this kind, in practical situations, has a major drawback which is associated with the variety of diameters of the optical fibres which are available commercially. In other words, for a given kind of single fibre, the value of the diameters varies between relatively wide limits of the order of + or −5%; thus, in the case of a single fibre having a nominal diameter of 100 microns, the limits range between 95 and 105 micron.

This situation leads to the drawback illustrated in FIG. 1, where two fibres F1 and F2 have been shown; it is clearly apparent from this illustration that the tangential relation ships indicated earlier having been satisfied, the smallest fibre F1 will have the centre C1 of its right circular section closer to the apex 10 of the Vee than the centre O2 of the corresponding right circular section of the larger fibre F2.

The axial position of the two fibres will therefore not be the same, with the consequences and drawbacks already referred to earlier. The distance d between the centres O1, O2, in a typical situation, may reach values of the order of $7\mu$, considering fibres of mean diameter $100\mu$, and this gives rise to an unacceptable loss, at the point of connection, of the order of around 0.4 decibels, a figure which is prohibitive in the case of telecommunication links where the total connection losses are around 0.5 decibels.

FIG. 2 schematically illustrates an embodiment of a positioning sleeve in accordance with the invention.

This sleeve takes the form of a body 21 of longitudinal axis 27 equipped with lateral faces such as those 22 and 24, a base face 23 parallel to said axis, a front contact face 25 and a rear face 33, and is also equipped with a longitudinal passage 26 opening onto the latter two faces. The passage is internally delimited by two planes marked 28 and 29 which intersect at the straight line of intersection 30 and define a dihedral as in the case of FIG. 1, forming a structure known as a Vee. However, the positioning sleeve in accordance with the invention differs fundamentally from a prior art kind of Vee as described in FIG. 1, in the sense that the longitudinal ridge or apex of the dihedral delimiting the passage, although still contained within the plane perpendicular to the plane of the base face, is no longer parallel to this base positioning plane 23, but makes with it a given angle A.

FIG. 3(a) and (b) illustrates, in the form of two explanatory diagrams, the implementation of the sleeve in accordance with the invention in the two situations where, (a) the optical fibre F1 has a given diameter and (b) the fibre F2 has a larger diameter.

In the first case, the axis of the optical fibre F1 will have a particular point T1 located at the requisite height E, at a distance L1 from the front contact face of the sleeve; in the second case, a point on the axis of the fibre F2 will again meet the condition of given height H but this time at a different distance L2 from the front contact face of the sleeve.

In accordance with the invention, it is therefore arranged that after the attachment of the single optical fibre in the passage, the assembly of sleeve and fibre is cut at a distance L from the front face 25 such that the right circular section of the fibre in the plane of cut, has its centre at the predetermined height H.

For a given difference in the diameters D, it can be shown by calculation that the difference between the respective distances L to be chosen for the cutting of the block, is linearly proportional to said given difference, the proportionality factor being the reciprocal of a trigonometric line of angle A, namely the tangent of said angle. Taking into account the differences in the diameters of the optical fibres normally industrially available, it in advantageous to employ a small angle A, typically of the order of 3 mins 30 seconds, which, taking account of the fact that the lengths L are inversely proportional to the tangent of said angle, means that for differences in cut length of the sleeve, measured along its longitudinal axis, a multiplication factor of several hundreds is obtained in relation to the differences in the diameters D of the optical fibres to be attached there, with consequent differences in the heights H to be achieved.

However, although calculation may enable these distances to be determined, an advantageous characteristic of the invention makes it possible to perform the cutting operation with precision and without any measurement other than the simple and immediate measurement of the diameter of the optical fibre which is to be attached.

FIG. 4 illustrates an embodiment of this characteristic. The invention here contributes the following, namely the fact that the angle made between the passage 26 and the longitudinal axis, having been chosen to have a small value, results in a multiplication factor between on the one hand the length L taken parallel to the base reference face, this itself being parallel to the base reference face, longitudinal axis, and the heights H takes perpendicularly to said face.

In accordance with the invention, a visual facility, such as a graduation produced by some known graphis method or other as for example printing, painting, engraving or moulding, is formed upon the sleeve, parallel to the longitudinal axis, on a lateral face chosen to enable easy observation during the cutting of the sleeve. The graduation can be designed in accordance with any logical or mathematical law which will provide a direct correlation between the length L, relative to the graduations, and the heights H marked by the digits located opposite the graduations.

It is particularly advantageous to mark the fibre diameters directly in the form of these digits, since, as already indicated, the difference in diameters D are directly associated with the differences in heights H.

The use of a positioning sleeve in accordance with the invention is therefore particularly straightforward in an industrial situation, since the mere knowledge of the diameter of the optical fibre to be connected makes it possible immediately to determine the location where it is necessary to cut or part off the sleeve, in order to achieve an optimum connection height.

FIG. 5 illustrates another embodiment of the positioning sleeve for a single industrial fibre, applied to the case of a connector tip arrangement. This embodiment uses cylindrical symmetry which lends itself particularly well to the conventional application in a connector of conventional structure.

The flat surfaces for the base and lateral positioning of the sleeve described earlier, are in this case cylindrical in shape, the cylinder having its generatrices parallel to the longitudinal axis and an angular orientation B in relation to an angular reference direction on the sleeve, yet to be defined: this is a function of the peg 40, cooperating with the groove 60 contained by the sleeve. However, the angular orientation, produced by the peg and groove arrangement need not be particularly accurate.

The conventional mechanical means used to form a peg and groove arrangement, yields substantially better angular accuracy.

The immobilising of the sleeve in the tip arrangement is then affected by means of a screw 66 cooperating with the screwed location 68 passing through an opening 67 in the tip arrangement. This opening is elongated to take account of the fact that the final length of the sleeve can vary as a function of the diameter of the single fibre located there.

FIG. 6 illustrates a pair of tip arrangements belonging to a connector for a single fibre, equipped with positioning sleeves in accordance with the invention.

The tip arrangements 70 and 71 are arranged opposite one another with their axes of symmetry in alignment, through the use of a centering sleeve 72.

The positioning sleeve 73 received the smallest diameter fibre 74 and has been cut and polished, following simple marking of the graduation, to the length required to achieve the distance H above its positioning base bottom generatrix; similarly, the sleeve 75 has been cut and polished under the same conditions, after observations of its particular graduation.

From a consideration of the Figure, the difference in length which results in the case of the sleeves can be seen, this being the reason for the presence of elongated openings 76 for their screwed attachment.

The result is clearly apparent in the Figure where, despite the major difference between the diameters $D_1$ and $D_2$ of the fibres, their contact faces have been properly centered opposite one another in a superimposed relationship, this achieving transmission with minimum losses.

Throughout the ensuing description it has been assumed that the sleeve will be cut or parted off using mechanical techniques.

However, any other means of parting off falls within the scope of the invention.

In particular, the sleeve can comprise a plurality of predetermined parting off joints defining a stack of elements whose mutual contact faces are attached together by adhesive or by a system of partial cutting, leaving a common base region.

The practical implementation of the sleeve then advantageously lends itself to the removal, by simple pulling, of unwanted elements, the steps of attachment of the optical fibre by cementing in position and of polishing or sawing being the only other steps which are required.

Finally, it should be pointed out that the sense in which the passage approaches the base face, in relation to the front contact face, is immaterial; in relation to said contact face, the passage can be a rising or descending one, without in any way modifying the fundamental characteristics of the invention.

Of course the invention is not limited to the embodiment described and shown which was given solely by way of example.

What is claimed is:

1. A positioning sleeve for connecting a single optical fibre having a known diameter, constituted: by a body having a longitudinal axis, a base positioning face, a top face parallel to said base positioning face and two lateral positioning faces, parallel to said axis, two terminal faces, respectively a front one and a rear one, this body containing a passage to receive a single fibre and opening onto said terminal faces, the walls of which are delimited by two planar portions extending to said top face forming a dihedral angle, wherein that said dihedral angle has its bisector disposed parallel to said axis and perpendicularly to said base positioning face, its apex making in relation to the plane of said base positioning face an angle comprised within a range of values in excess of 0° and less than 10°, at least one of said positioning faces having length markings disposed thereon parallel to said longitudinal axis so that the height of the longitudinal axis of said fibre along the portion of said fibre received in said passage may be readily determined.

2. A positioning sleeve for connecting a single optical fibre as claimed in claim 1, wherein said positioning faces are portions of a plane.

3. A positioning sleeve as claimed in claim 1, wherein said positioning faces are cylindrical portions of generatrices which are parallel to said longitudinal axis.

4. A connector for a single optical fibre, constituted by two tip arrangements equipped with means for their mutual centering and angular orientation, as well as with means for their attachment, wherein one of the two tip arrangements at least, comprises a positioning sleeve as claimed in claim 1.

5. A connector as claimed in claim 4, wherein said positioning sleeve is angularly arranged in the tip arrangement, where it is located by a device of the peg and groove kind.

6. A connector as claimed in claim 4 wherein said positioning sleeve is longitudinally secured in the tip arrangement by a device of the screw and groove kind.

7. A method for positioning the optical contact face of a single optical fibre of known diameter for application to a connector at a given transverse position, employing at least one positioning sleeve, said sleeve including a body having a longitudinal axis, a base positioning face and two lateral positioning faces, parallel to said axis, two terminal faces, respectively a front one and a rear one, this body containing a passage to receive a single fibre and opening onto said terminal faces, the walls of which are delimited by two planar portions forming a dihedral angle, wherein that said dihedral angle has its bisector disposed parallel to said axis and perpendicularly to said base positioning face, its apex making in relation to the plane of said base positioning face an angle comprised within a range of values in excess of 0° and less than 10°, said method comprising the following steps:

the attachment, by cementing of said single optical fibre of known diameter in the passage within said sleeve;

the determination, by calculation, of the point on the longitudinal axis of the sleeve, where the axis of the single fibre is at said given transverse position in relation to said base positioning face, as a function of said known diameter;

the parting off of the assembly of sleeve and single fibre at a perpendicular plane passing through said point on the longitudinal axis, the sleeve thereby bearing the optical contact face of said fibre at said given transverse position.

8. A positioning method as claimed in claim 7, wherein said length markings disposed parallel to said longitudinal axis are previously distributed in accordance with said calculated disposition.

* * * * *